United States Patent [19]

Boyd

[11] Patent Number: 4,507,033
[45] Date of Patent: Mar. 26, 1985

[54] LOAD SECURING APPARATUS FOR A CARGO CARRYING VEHICLE

[76] Inventor: Walter K. Boyd, 3100 Maricopa, Riverside, Calif. 92507

[21] Appl. No.: 352,799

[22] Filed: Feb. 26, 1982

[51] Int. Cl.³ .............................................. B60P 7/14
[52] U.S. Cl. .................................... 410/104; 248/507; 248/558; 296/37.6; 410/36; 410/130; 410/140
[58] Field of Search ....................... 410/11, 12, 89, 96, 410/99, 100, 102, 103–115, 118, 121, 127, 129, 130, 132, 140, 141, 143, 150, 152, 36, 37, 42, 1; 224/281, 282, 42.45 R, 42.46 R; 248/503, 507, 508, 509, 558, 499; 296/37.6

[56] References Cited

U.S. PATENT DOCUMENTS

| | | | |
|---|---|---|---|
| 776,541 | 12/1904 | Patterson | 410/36 |
| 2,680,544 | 6/1954 | Hunt, Sr. et al. | 224/42.45 R |
| 2,697,631 | 12/1954 | Miller | 410/140 |
| 3,044,800 | 7/1962 | Wicker | 410/129 |
| 3,115,102 | 12/1963 | Rolfe, Jr. et al. | 410/130 |
| 3,428,282 | 2/1969 | Pernice | 410/110 |
| 4,199,127 | 4/1980 | Osborn | 248/507 |
| 4,236,584 | 12/1980 | Rogers | 410/129 |
| 4,248,558 | 2/1981 | Lechner | 410/110 |
| 4,278,376 | 7/1981 | Hunter | 410/104 |
| 4,383,695 | 5/1983 | Ray | 248/558 |

Primary Examiner—David A. Scherbel
Assistant Examiner—Donald T. Hajec
Attorney, Agent, or Firm—Gordon L. Peterson

[57] ABSTRACT

An apparatus for use with a vehicle having an open-topped cargo carrying compartment with first and second side walls which includes first and second elongated side rails attached to the side walls, respectively, and first and second connectors mounted on the first and second side rails, respectively, for movement along the associated side rail. The connectors can be locked in position along their associated side rails. First and second retainers are coupled to the first and second connectors, respectively, for movement with the connectors and the retainers are adapted to extend into the cargo-carrying compartment. Each of the retainers can retain one side of a divider in position within the cargo-carrying compartment.

13 Claims, 8 Drawing Figures

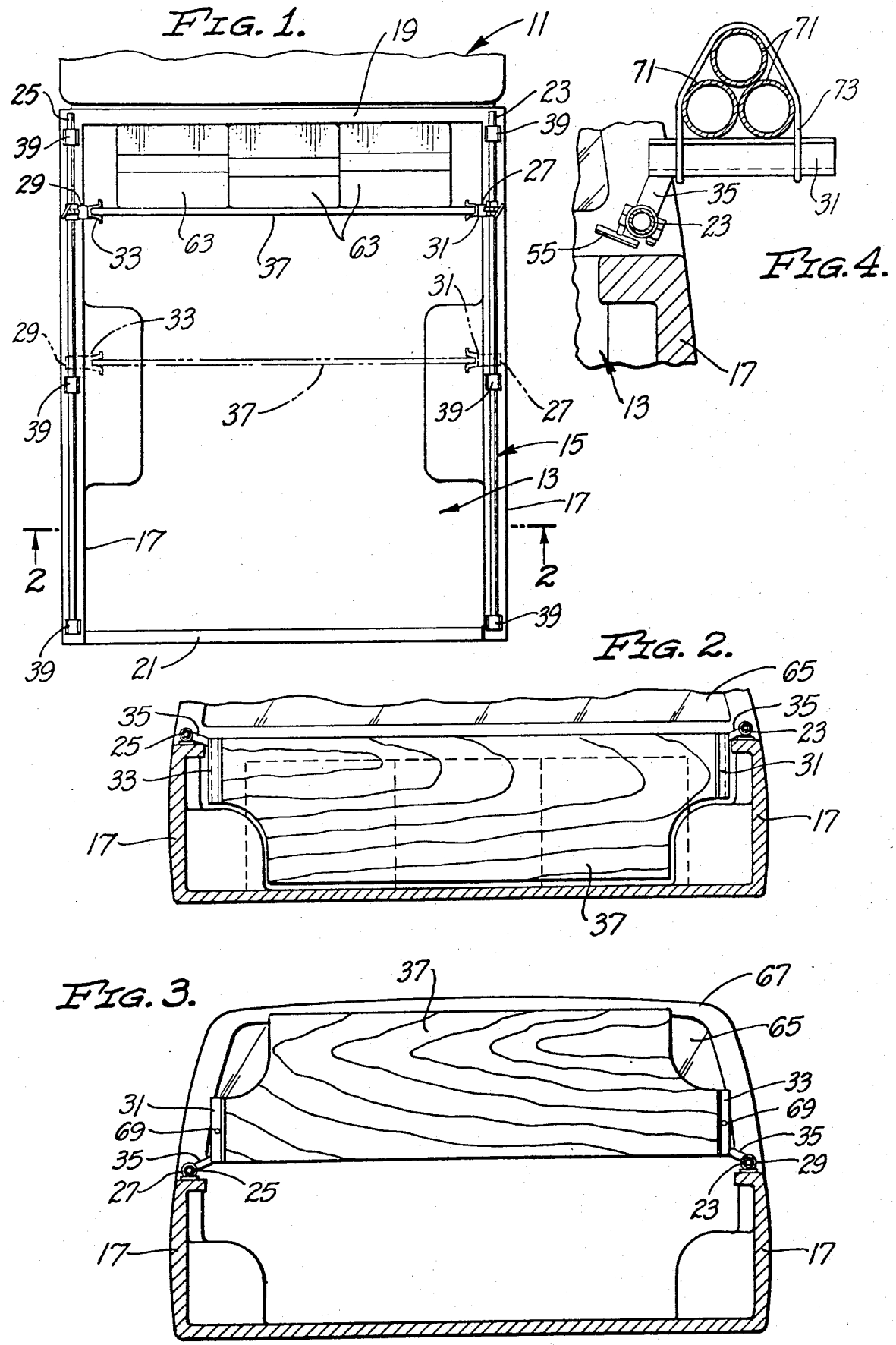

U.S. Patent  Mar. 26, 1985  Sheet 2 of 2  4,507,033
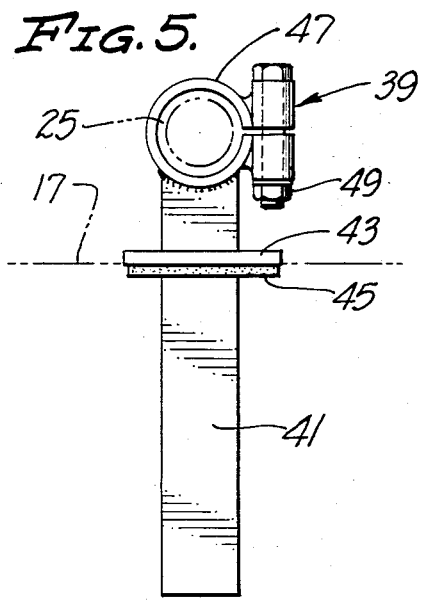
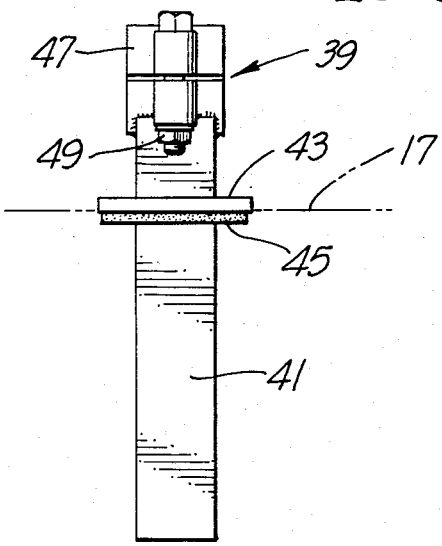
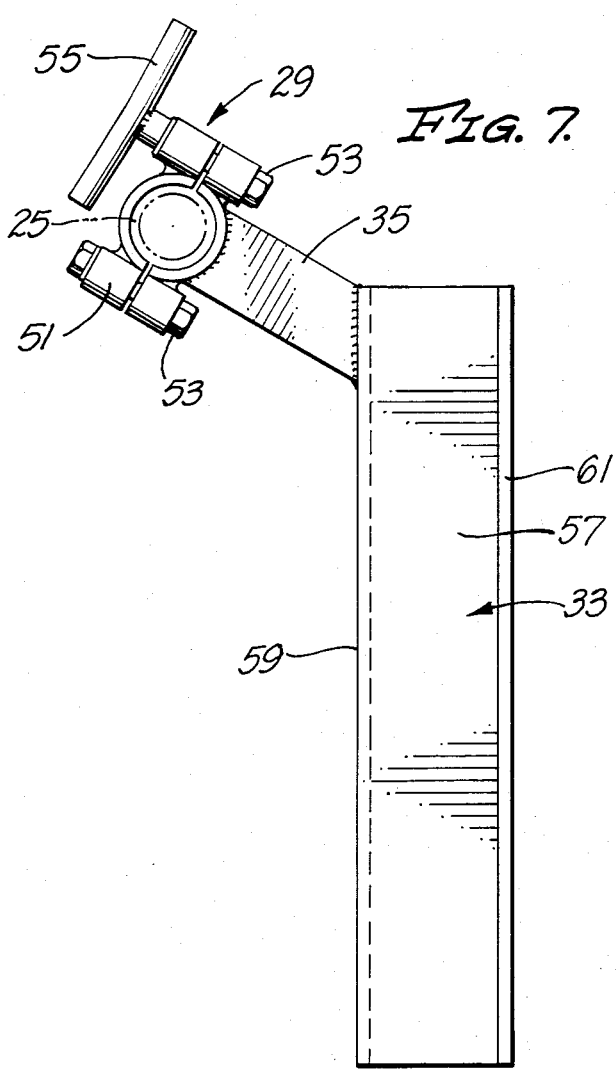
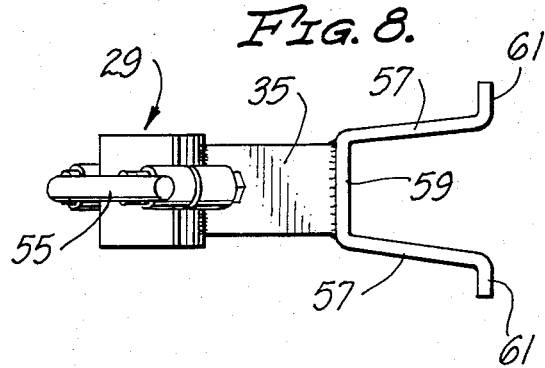

LOAD SECURING APPARATUS FOR A CARGO CARRYING VEHICLE

BACKGROUND OF THE INVENTION

Various cargo-carrying vehicles, such as pickup trucks and certain trailers have open-topped cargo-carrying compartments. For many hauling requirements, the cargo-carrying compartment is much larger than the load being carried. In this event, forces imposed on the load due to various factors, such as vehicle acceleration and wind, can cause the load to move within the cargo-carrying compartment, and these movements can be sufficiently violent to damage the load or the interior of the cargo-carrying compartment.

To retain the load in position, it has been proposed to partition the cargo-carrying compartment, and one such device, which is applicable to a roll-top pickup box is shown in Miller U.S. Pat. No. 2,697,631. In the patented construction, two channels are mounted on the side walls of the pickup truck box, and these channels can support a divider which partitions the truck box.

The patented construction is usable only with roll-top pickup truck boxes which were in use many years ago. Although the location of the partition in the patented device can be changed, it requires the sliding of curved members along the roll top of the pickup truck box, and this would seem to inherently provide paint damage. Also, the channels are fixed in position by insertion of the divider or by bolting them to the side of the truck box, and neither of these techniques is desirable.

SUMMARY OF THE INVENTION

This invention provides a novel apparatus for securing a load within various open-topped cargo-carrying vehicles and is not limited to roll-top pickup boxes or any other particular characteristic of an open-topped cargo carrying compartment. An apparatus constructed in accordance with the teachings of this invention can be used for a multiplicity of purposes and is not limited to partitioning of the cargo-carrying compartment or to load securing functions.

An apparatus constructed in accordance with this invention advantageously includes first and second elongated side rails attached to the side walls of the cargo-carrying compartment. Preferably, the side rails are adjacent the upper ends of the side walls and they extend along the side walls. First and second connectors are mountable on the side rails, respectively, for movement along the associated side rail, and the connectors can be fixed in any of a plurality of positions along their associated side rails. First and second retainers are coupled to the first and second connectors, respectively, for movement therewith. These retainers are adapted to extend into the cargo-carrying compartment. Each of the retainers includes means for retaining one side of a divider in position within the cargo-carrying compartment.

With this construction, the side rails support the connectors for movement so that apparatus of this invention can be used with cargo-carrying compartments of various different constructions. The side rails provide tie-down locations for tying cargo within the compartment, and they contribute to the versatility of the apparatus. Although the side rails may be internal tracks within the side walls, they are preferably in the form of elongated tubes mounted on the exterior of the side walls. The tube may be of any cross-sectional configuration which allows the connector to move along it.

Each of the connectors preferably includes first and second connector sections and means for releasably retaining the connector sections on the associated side rail. With this construction, the connector can be easily removed from, and reattached to, the side rail.

The side rails and the connectors cooperate to provide the apparatus with considerable versatility. For example, both of the connectors may be attached to the same side rail and arranged with the retainers extending outboard of the cargo-carrying compartment. In this event, the retainers form support members for retaining a load, the length of which may greatly exceed the length of the cargo-carrying compartment.

The connectors can be removed from their side rails and reattached in a reverse position so as to retain the divider in an elevated position to protect the back window of the pickup truck from the cargo being hauled. For this purpose, the divider may be retained on the top edge of the forward wall of the pickup truck box, or it may be suitably retained by the retainers in the elevated position.

The apparatus can also be used to retain a small load in a corner of the cargo-carrying compartment by positioning the connectors on the side rails so that the divider extends somewhat diagonally between the side walls rather than perpendicular to the side walls. To retain the divider in this somewhat diagonal position, one or both of the connectors can be pivoted about the associated side rail and retained in the desired angular position. For this purpose, each of the retainers may include a channel with diverging legs. Also, the ability of the connectors to be pivoted inwardly enables the retainers to be jammed tightly against the edges of the divider to hold the divider down. For this purpose, the edges of the divider may form a tight fit within the retainer.

With the construction described above, each of the connectors can be fixed in position along the associated side rail by clamping the sections of the connector together about the side rail. Although different constructions can be used, each of the retainers preferably includes a channel for receiving an edge portion of the divider. The retainer is advantageously coupled to the associated connector by an arm which projects along a path which extends downwardly and inwardly when the retainer is within the cargo-carrying compartment. However, when the apparatus is being used to support a load outboard of the truck box, the arm extends upwardly and outwardly so that the load is supported above the top of the side wall of the truck box.

The invention, together with additional features and advantages thereof, may best be understood by reference to the following description taken in connection with the accompanying illustrative drawing.

BRIEF DESCRIPTION OF THE DRAWING

FIG. 1 is a fragmentary top plan view of a pickup truck having an apparatus constructed in accordance with the teachings of this invention mounted thereon.

FIG. 2 is a fragmentary sectional view taken generally along line 2—2 of FIG. 1.

FIG. 3 is a fragmentary sectional view taken on the same plane as FIG. 2 showing how the apparatus of this invention can be used to protect the rear window of a pickup truck.

FIG. 4 is a fragmentary, sectional view showing how the apparatus of this invention can be used to support a load outboard of the truck box.

FIGS. 5 and 6 are front and side elevational views, respectively, illustrating one form of mounting member for mounting the side rails on the truck box.

FIGS. 7 and 8 are front elevational and top plan views, respectively, of one form of connector and retainer.

DESCRIPTION OF THE PREFERRED EMBODIMENT

FIGS. 1 and 2 show a pickup 11 having a cargo-carrying compartment in the form of a pickup truck box 13. A load-securing apparatus 15 is mounted on the truck box 13. Of course, the apparatus 15 could be mounted on other open-topped cargo-carrying compartments. The truck box 13 has vertical parallel side walls 17, a front wall 19 and the usual pivotable tailgate 21.

The apparatus 15 includes elongated side rails 23 and 25, connectors 27 and 29 and retainers 31 and 33 (FIG. 2) joined to the associated connector by an arm 35. The apparatus 15 may also be considered as including a partition 37, although whether or not the partition is used will depend upon the use to which the load-securing apparatus 15 is being put.

The side rails 23 and 25 are preferably mounted on the side walls 17, respectively, so that they extend along and about their respective side wall. Although the mounting of the side rails can be accomplished in many different ways, the apparatus 15 may include two or more mounting members 39 for mounting each of the side rails 23 and 25. In the embodiment illustrated, each of the side rails 23 and 25 is in the form of a cylindrical tube and has one of the mounting members 39 at its opposite ends and an intermediate mounting member positioned centrally.

Each of the mounting members 39 may be identical, and for example, constructed as shown in FIGS. 5 and 6. Each of the mounting members 39 includes a post 41 receivable in a pocket (not shown) of the associated side wall, a flange 43 coupled to the post, a seal 45 contiguous the flange and adapted to engage the top edge of the associated side wall of the truck box, and a bearing 47 in the form of a C-clamp at the upper end of the post. The side rails 23 and 25 are receivable within the associated bearings 47 and the bearings can be tightened to firmly grip the side rails by tightening of an associated threaded fastener 49. The posts 41 are retained within the side walls 17 in any suitable manner, such as by threaded fasteners (not shown).

The connectors 27 and 29 may be identical, and one form of the connector 29 is shown in FIGS. 7 and 8. The connector 29 includes a pair of U-brackets 51 and a pair of threaded fasteners 53 for holding the brackets together. One of the fasteners 53 has a handle 55 to facilitate manual loosening and tightening of the brackets 51 around the side rail 25. Because the brackets 51 are held together by the threaded fasteners 53, they can be easily attached to, and removed from, the side rail 25. In addition, the brackets 51 can be easily loosened to enable sliding of the connector along the side rail and then tightened to fix the connector in the desired position along the side rail.

The retainers 31 and 33, which may be identical, can advantageously be in the form of flanged channels. Thus, the retainer 33 shown in FIGS. 7 and 8 comprises diverging legs 57 integrally joined by a web 59 and having flanges 61 at their distal ends. The retainer 33 is joined to the lower bracket 51 by the arm 35 which, in the position of FIG. 5, extends downwardly and inwardly from the lower bracket to the upper portion of the web 59. In the embodiment illustrated, the connector 29, the retainer 33, and the arm 35 are constructed of metal, and the arm is welded to the lower bracket 51 and the retainer 33.

The apparatus 15 has numerous uses, and in the configuration shown in FIGS. 1 and 2, is being used to retain boxes 63 between the front wall 19 and the partition 37. For this purpose, the handles 55 of the connectors 27 and 29 are turned to loosen the U-brackets 51 to enable the connectors to be slid to the solid-line position shown in FIG. 1. Thereafter, the handles 55 are turned to tighten the associated fasteners 53 to lock the connectors 27 and 29 in this position. The partition 37 has its edge portions received within the channels of the retainers 31 and 33 and can be moved separately or with the connectors 27 and 29. In any event, in the position of FIG. 1, the boxes 63 are tightly retained between the partition 37 and the front wall 19 of the truck box 13 so that the boxes cannot move longitudinally within the truck box.

FIG. 1 shows in phantom line another illustrative position to which the partition 37 can be moved. The connectors 27 and 29 can be removed positioned rearwardly of the central mounting members 39, if desired. However, this will ordinarily not be necessary if the central mounting members 39 are at or near the longitudinal midpoint of the truck box 13 because loads longer than one half of the longitudinal dimension of the truck box can then be stored in the aft chamber between the partition and the tailgate 21.

FIG. 3 shows how the apparatus 15 can be used to protect the rear window 65 of the pickup cab 67 from any load contained in the truck box 13. To accomplish this, the connectors 27 and 29 are removed from the side rails 23 and 25 and reinstalled with the arms 35 extending inwardly and upwardly and with the channels of the retainers 31 and 33 opening inwardly to receive edge portions of the partition 37. The partition 37 is retained in the elevated position shown in which it confronts and shields the rear window 65 by resting it on the upper edge of the front wall 19 and/or by extending pins 69 through the retainers 31 and 33 and the edge portions of the partition 37.

FIG. 4 shows the apparatus 15 being used to support a long load outboard of the truck box 13. For this purpose, both of the connectors 27 and 29 are installed on the same side rail, and in the form shown in FIG. 4, both of them are installed on the side rail 23. When so installed, the arm 35 projects upwardly and outwardly, and the channels of the retainers 31 and 33 open upwardly. Thus, the retainers 31 and 33 are supported above the side wall 17 and they extend outboard of the side wall. This enables a long load, such as pipe 71 to be supported on the retainers 31 and 33 and attached thereto by rope 73.

The apparatus 15 can also be used to retain broad panels, such as plywood, on the bottom of the truck box 13 by allowing the partition to rest on top of the panels while the partition is vertically supported by the retainers 31 and 33. The side rails 23 and 25 can also be used as tie points for tying various loads in the truck box 13.

Although an exemplary embodiment of the invention has been shown and described, many changes, modifications and substitutions may be made by one having ordinary skill in the art without necessarily departing from the spirit and scope of this invention.

What is claimed is:

1. An apparatus for use with a vehicle having an open-topped cargo-carrying compartment with first and second side walls having upper ends, said apparatus comprising:

first and second elongated side rails;

means for attaching said side rails to the first and second side walls, respectively, adjacent the upper ends thereof with the side rails extending along their associated side wall and said rails and said side walls being physically separate members;

first and second connectors mountable on the first and second side rails, respectively, for movement along the associated side rail whereby the position of each of the connectors along its associated side rail can be adjusted;

said connectors including means engaging the side rails for releasably locking said connectors in any of a plurality of positions along their associated side rails;

first and second retainers coupled to the first and second connectors, respectively, for movement therewith and adapted to extend into the cargo-carrying compartment;

each of said retainers including means for retaining one side of a divider within the cargo-carrying compartment; and said locking means being the sole means for releasably locking the first connector and the first retainer on said first side rail whether or not the divider is retained by the first retainer.

2. An apparatus as defined in claim 1 wherein said first connector includes first and second removable connector sections and means for releasably retaining the connector sections on the first side rail whereby said first connector can be easily removed from the first side rail.

3. An apparatus as defined in claim 1 wherein said first side rail includes an elongated tube and said attaching means mounts the tube above the first side wall.

4. An apparatus as defined in claim 1 wherein said first and second retainers include means for retaining the divider at an elevated position.

5. An apparatus as defined in claim 1 wherein said first retainer includes a channel for receiving an edge portion of the divider.

6. An apparatus for use with a vehicle having an open-topped cargo-carrying compartment with first and second side walls having upper ends, said apparatus comprising:

first and second elongated tubes;

means for attaching said tubes to the first and second side walls, respectively, adjacent the upper ends thereof with the tubes extending along their associated side wall;

first and second connectors, each of said connectors having a mounting portion which at least partially circumscribes an associated tube to mount the first and second connectors on the first and second tubes, respectively, for movement along the associated tube whereby the position of each of the connectors along its associated tube can be adjusted;

said connectors including means engaging the tubes for releasably locking said connectors in any of a plurality of positions along their associated tubes;

first and second retainers coupled to the first and second connectors, respectively, for movement therewith and adapted to extend into the cargo-carrying compartment;

each of said retainers including means for retaining one side of a divider within the cargo-carrying compartment; and said locking means releasably locking the first connector on the first tube whether or not the divider is retained by the first retainer and being the sole means for locking the first connector and the first retainer on the first tube.

7. An apparatus as defined in claim 6 wherein each of said mounting portions includes a clamp for selectively clamping the associated tube and said locking means includes means for tightening and loosening the clamp.

8. An apparatus as defined in claim 6 wherein said mounting portion of said first connector includes first and second brackets and said locking means includes means for releasably retaining the connector sections on the first tube whereby said first connector can be easily removed from the first tube.

9. An apparatus for use with a vehicle having an open-topped cargo-carrying compartment with first and second side walls having upper ends, said apparatus comprising:

first and second elongated side rails;

means for attaching said side rails to the first and second side walls, respectively, adjacent the upper ends thereof with the side rails extending along their associated side wall and said rails and said side walls being physically separate members;

first and second connectors mountable on the first and second side rails, respectively, for movement along the associated side rail whereby the position of each of the connectors along its associated side rail can be adjusted;

means for fixing said connectors in any of a plurality of postions along their associated side rails;

first and second retainers coupled to the first and second connectors, respectively, for movement therewith and adapted to extend into the cargo-carrying compartment;

each of said retainers including means for retaining one side of a divider in position within the cargo-carrying compartment; and said first connector being mountable on the first side rail for pivotal movement about said first side rail and said fixing means can fix the first connector and the first retainer in any one of a plurality of angular positions about the first side rail.

10. An apparatus for use with a vehicle having an open-topped cargo-carrying compartment with first and second side walls having upper ends, said apparatus comprising:

first and second elongated side rails;

means for attaching said side rails to the first and second side walls, respectively, adjacent the upper ends thereof with the side rails extending along their associated side wall and said rails and said side walls being physically separate members;

first and second connectors mountable on the first and second side rails, respectively, for movement along the associated side rail whereby the position of each of the connectors along its associated side rail can be adjusted;

means for fixing said connectors in any of a plurality of positions along their associated side rails;

first and second retainers coupled to the first and second connectors, respectively, for movement therewith and adapted to extend into the cargo-carrying compartment;

each of said retainers including means for retaining one side of a divider in position within the cargo-carrying compartment; and each of said connectors being removable from the associated side rail and mountable on the first side rail so that each of the retainers extends outboard of the first side rail to support a load.

11. An apparatus for use with a vehicle having an open-topped cargo-carrying compartment with first and second side walls having upper ends, said apparatus comprising:

first and second elongated side rails;

means for attaching said side rails to the first and second side walls, respectively, adjacent the upper ends thereof with the side rails extending along their associated side wall and said rails and said side walls being physically separate members;

first and second connectors mountable on the first and second side rails, respectively, for movement along the associated side rail whereby the position of each of the connectors along its associated side rail can be adjusted;

means for fixing said connectors in any of a plurality of positions along their associated side rails;

first and second retainers coupled to the first and second connectors, respectively, for movement therewith and adapted to extend into the cargo-carrying compartment;

each of said retainers including means for retaining one side of a divider in position within the cargo-carrying compartment; and the retainers being adapted to extend downwardly into the cargo-carrying compartment and said connectors are removable from the associated side rails and mountable on the side rails so that the retainers extend upwardly to provide support for a panel-like member at least a part of which is above the side rails.

12. An apparatus for use with a vehicle having an open-topped cargo-carrying compartment with first and second side walls having upper ends, said apparatus comprising:

first and second elongated side rails;

means for attaching said side rails to the first and second side walls, respectively, adjacent the upper ends thereof with the side rails extending along their associated side wall and said rails and said side walls being physically separate members;

first and second connectors mountable on the first and second side rails, respectively, for movement along the associated side rail whereby the position of each of the connectors along its associated side rail can be adjusted;

means for fixing said connectors in any of a plurality of positions along their associated side rails;

first and second retainers coupled to the first and second connectors, respectively, for movement therewith and adapted to extend into the cargo-carrying compartment;

each of said retainers including means for retaining one side of a divider in position within the cargo-carrying compartment;

an arm for coupling said first connector to said first retainer, said arm projecting inwardly from said first connector when the retainer extends into the cargo-carrying compartment; and each of said connectors being removable from the associated side rail and mountable on the first side rail so that each of the retainers extends outboard of the first side rail to support a load with said arm extending along a path having an upward component with respect to said first side rail to support the first retainer above the first side rail.

13. An apparatus for use with a vehicle having an open-topped cargo-carrying compartment with first and second side walls having upper ends, said apparatus comprising:

first and second elongated tubes;

means for attaching said tubes to the first and second side walls, respectively, adjacent the upper ends thereof with the tubes extending along their associated side wall;

first and second connectors, each of said connectors having a mounting portion which at least partially circumscribes an associated tube to mount the first and second connectors on the first and second tubes, respectively, for movement along the associated tube whereby the position of each of the connectors along its associated tube can be adjusted;

means for fixing said connector in any of a plurality of positions along their associated tubes;

first and second retainers coupled to the first and second connectors, respectively, for movement therewith and adapted to extend into the cargo-carrying compartment;

each of said retainers including means for retaining one side of a divider in position within the cargo-carrying compartment; and said mounting means of said first connector being mountable on the first tube for pivotal movement about said first tube and said fixing means can fix the first connector and the first retainer in any one of a plurality of angular positions about the first tube.

* * * * *